United States Patent
Finley et al.

(10) Patent No.: US 7,161,525 B1
(45) Date of Patent: Jan. 9, 2007

(54) TURBULENCE DISPLAY PRESENTATION

(75) Inventors: Jeffrey A. Finley, Cedar Rapids, IA (US); Steve Paramore, Cedar Rapids, IA (US); Charles J. Dickerson, Alburnett, IA (US); Bryan L. Jurgensen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 141 days.

(21) Appl. No.: 11/062,500

(22) Filed: Feb. 22, 2005

(51) Int. Cl.
   *G01S 7/04* (2006.01)
(52) U.S. Cl. .................. 342/26 R; 342/26 B; 342/179; 342/182; 342/183
(58) Field of Classification Search ............. 342/26 R, 342/26 A, 26 B, 26 C, 26 D, 176, 179, 182, 342/183
   See application file for complete search history.

(56) References Cited

U.S. PATENT DOCUMENTS

| | | | |
|---|---|---|---|
| 5,198,819 A * | 3/1993 | Susnjara | 342/26 B |
| 5,517,193 A * | 5/1996 | Allison et al. | 342/26 R |
| 5,828,332 A * | 10/1998 | Frederick | 342/26 B |
| 5,892,519 A * | 4/1999 | Hirai | 345/440 |
| 6,199,008 B1 * | 3/2001 | Aratow et al. | 701/120 |
| 6,653,947 B1 * | 11/2003 | Dwyer et al. | 340/970 |
| 6,683,609 B1 * | 1/2004 | Baron et al. | 345/419 |
| 2002/0091488 A1 * | 7/2002 | Baron et al. | 702/3 |
| 2002/0113826 A1 * | 8/2002 | Chuang | 345/835 |
| 2005/0027449 A1 * | 2/2005 | Marsh | 701/213 |
| 2005/0086227 A1 * | 4/2005 | Sullivan et al. | 707/7 |
| 2005/0156745 A1 * | 7/2005 | Chan | 340/601 |

FOREIGN PATENT DOCUMENTS

GB     2133256 A * 7/1984

OTHER PUBLICATIONS

"The use of digital map data for airborne operations", Bennett, P.J. Serious Low Flying (Ref. No. 1998/223), IEE Colloquium on Feb. 16, 1998 pp. 2/1-210.*

"Regularized Doppler radar imaging for target identification in atmospheric clutter", Ciuciu, P.; Idier, M. Acoustics, Speech, and Signal Processing. Proceedings. (ICASSP '04), IEEE International Conference on vol. 5, May 17-21, 2004 pp. V-265-8.*

* cited by examiner

*Primary Examiner*—John B. Sotomayor
(74) *Attorney, Agent, or Firm*—Nathan O. Jensen; Kyle Eppele

(57) ABSTRACT

A method of displaying areas of turbulent weather is disclosed. Data is processed representative of weather conditions within a predefined area. Weather conditions are displayed on a display. Turbulence is detected within the predefined area. A level of the detected turbulence is detected. First graphical elements are superimposed upon the display of weather conditions when the level of the detected turbulence is less than a predetermined amount. A second graphical element is displayed upon the display of weather conditions when the level of the detected turbulence is more than the predetermined amount.

20 Claims, 7 Drawing Sheets

TURBULENCE DISPLAY PRESENTATION

FIELD OF THE INVENTION

The invention relates to avionics display technology, and more particularly, to the improved representation of turbulence levels on an avionics display.

BACKGROUND OF THE INVENTION

Turbulent atmospheric conditions are a special concern to aircraft because of the potential for passenger injury and aircraft damage. Consequently, avionics systems have been developed to alert an aircraft pilot when potentially turbulent conditions have been detected nearby. For example, current weather radar systems indicate regions of nearby weather conditions with a range of several colors, such as green, yellow and red, which indicate increasingly hazardous conditions. Regions where potentially turbulent conditions have been detected have been depicted with the color magenta. However, most turbulent regions are adjacent hazardous weather regions that are displayed as red areas. Because the human eye tends to merge magenta and red and to de-emphasize the magenta, a weather display utilizing such a color scheme may be very difficult to interpret by a pilot. One solution may be to use a different color to represent regions of turbulent conditions, but most current display systems are not designed to present colors other than black, green, yellow, red, and magenta on weather radar displays, even though the radar itself is capable of requesting additional colors.

A further difficulty with known weather displays is that turbulence is identified with a single color with no consideration for the intensity of the detected turbulent conditions. For example, slight turbulence may cause discomfort to passengers in an airplane, while intense or severe turbulence may damage the aircraft and injure the passengers and flight crew.

It is therefore an object of the invention to provide a representation of turbulent weather conditions on an avionics display by which areas of turbulence are readily detected.

It is also an object of the invention to provide such a representation of turbulent weather conditions with colors used in current weather display protocols.

It is a further object of the invention to provide a representation of turbulent weather conditions that differentiates between regions of slight turbulence and regions of intense or severe turbulence.

A feature of the invention is a multi-tiered approach to the representation of turbulent weather conditions by speckling the display with magenta spots in regions of slight turbulence, increasing the density of the speckles as turbulence increases, and displaying a solid magenta object or icon in regions of severe turbulence.

An advantage of the invention is rapid and accurate identification by a pilot of nearby turbulent weather conditions.

SUMMARY OF THE INVENTION

The invention provides a method of displaying areas of turbulent weather. According to the method, data is processed representative of weather conditions within a predefined area. Weather conditions are displayed upon a display. Turbulence is detected within the predefined area. A level of the detected turbulence is detected. First graphical elements are superimposed upon the display of weather conditions when the level of the detected turbulence is less than a predetermined amount. A second graphical element is superimposed upon the display of weather conditions when the level of the detected turbulence is more than the predetermined amount.

The invention also provides an avionics weather display system. Means are provided for processing data representative of weather conditions within a predefined area. Means are provided for displaying the weather conditions. Means are provided for detecting turbulence within the predefined area and for determining a level of the detected turbulence. Means are provided for superimposing first graphical elements upon the means for displaying the weather conditions when the level of the detected turbulence is less than a predetermined amount. Means are provided for superimposing a second graphical element upon the means for displaying the weather conditions when the level of the detected turbulence is more than the predetermined amount.

The invention further provides an avionics weather display system. A processor processes data representative of weather conditions within a predefined area, detects turbulence within the predefined area, and determines a level of the detected turbulence. An avionics display depicts weather conditions within the predefined area, including the detected turbulence. The depiction of the detected turbulence is a plurality of first graphical elements superimposed upon the depicted weather conditions when the level of the detected turbulence is less than a predetermined amount. A second graphical element is superimposed upon the depiction weather conditions when the level of the detected turbulence is more than the predetermined amount.

DETAILED DESCRIPTION OF THE DRAWINGS

Figure 1:
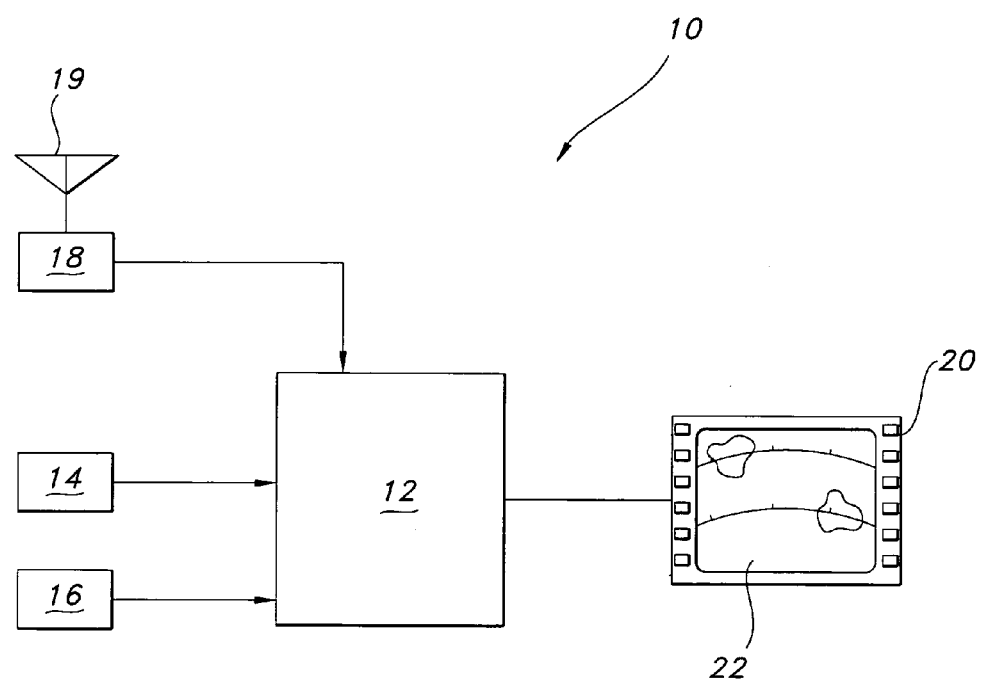
FIG. 1 is a schematic diagram of an avionics system according to the invention.

A schematic representation of an avionics system usable with the invention is shown in FIG. 1 and is indicated generally by reference number 10. Avionics system 10 is installed in an aircraft (not shown). Avionics system 10 includes an avionics processing unit 12 that accepts inputs from weather radar 14 and other onboard sensors 16 of atmospheric conditions. Avionics processing unit 12 may also receive inputs from one or more receivers 18 that receive, through an antenna 19, signals or messages from ground-based, satellite-based, or airborne transmitters or signal relays (not shown). The signals or messages from such transmitters or signal relays include information relating to weather activities in the general area of the aircraft in which the avionics system is installed. Avionics processing unit 12 processes the inputs from the weather radar, onboard sensors 16, and receiver 18, and determines, within a range of possible flight paths of the aircraft, regions of weather conditions or severity. Such weather severity may be indicated by precipitation levels, wind speed, air temperature, or a combination of these or other factors. For the range of possible flight paths, avionics processing unit 12 creates a weather map that assigns a color to areas having predetermined levels of weather severity with different colors. For example, in a preferred embodiment, areas of slight weather severity are expressed by the color green, moderate severity by the color yellow, and high severity by the color red. Areas with weather conditions judged by the avionics processing unit to have no or negligible levels of severity are assigned the color black, or are not assigned any color if the weather map is to be combined with a display of nearby terrain or other information.

Avionics processing unit 12 sends the created weather map to an avionics display 20. The display output 22 of display 20 graphically depicts the areas of varying weather severity. The display output 22 shown in FIG. 2 displays a weather system 24 having green, yellow, and red-shaded regions 26, 28, 30 representing slight, moderate, and high levels of weather severity, respectively. Also shown is an area 32*a* where conditions indicative of slight turbulence are present. Slight turbulence may be defined as turbulence causing little discomfort to passengers and no damage to the aircraft. Slight turbulence area 32*a* is represented by a plurality of graphical elements, which in the preferred embodiment are displayed as a randomly distributed group of magenta-colored spots. As the intensity of the detected turbulence increases, the density of the magenta-colored spots increases as well, as shown by moderate turbulence area 32*b*. Moderate turbulence may be defined as turbulence causing some discomfort to passengers of the aircraft. The speckled pattern of spots representing turbulence areas 32*a* and 32*b* are shown as overlaying upon yellow-shaded region 28. When slight or moderately turbulent conditions are detected in a red-shaded region of high weather severity such as region 30 in FIG. 2, the size of the magenta-colored spots 32*c* representing such turbulent area are slightly increased to enable the turbulent conditions to be more easily identified by a viewer of the display.

Figure 2:
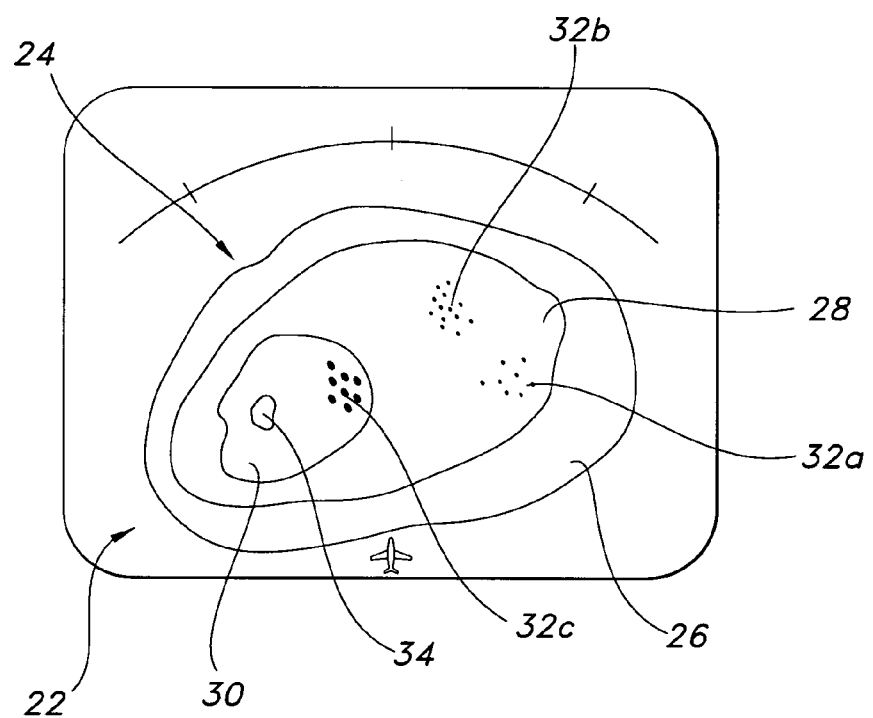
FIG. 2 is a representation of a display output according to the invention.
Figure 3:
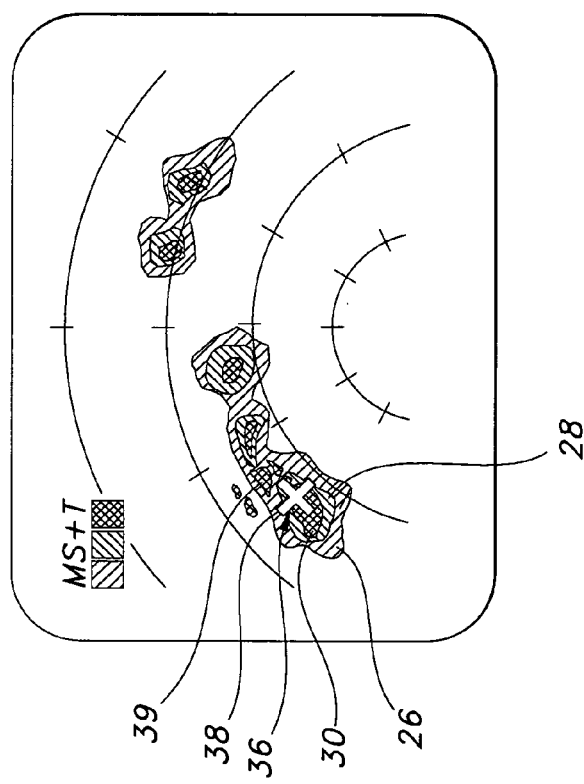
FIG. 3 is another representation of a display output according to the invention.

To apprise a viewer of the display of areas of hazardous or severe turbulence (which may be defined as turbulence causing injury to passengers and/or damage to aircraft), a graphical element such as a solid magenta-colored region 34 is superimposed upon the display at a position representative of its location with respect to the aircraft. In one embodiment, as shown in FIG. 2, the solid magenta-colored region 34 has a shape representative of the actual shape of the area of severe turbulence. In another embodiment, the area of severe turbulence is identified with a superimposed graphical icon 36 having the shape of an "x" as shown in FIG. 3. Graphical icon 36 is preferably a magenta color, which is the same color used to identify other turbulent areas 32*a*, 32*b*, 32*c*, and 34. Because graphical icon 36 is overlaid upon other regions of weather severity 26, 28 and 30, the outer border 38 of the graphical icon is rendered as black or another contrasting color so that the icon readily contrasts with surrounding weather information. It can further be seen that separate areas of moderate turbulence, such as region 39, can be rendered on the same screen as areas of hazardous turbulence.

Figure 4:
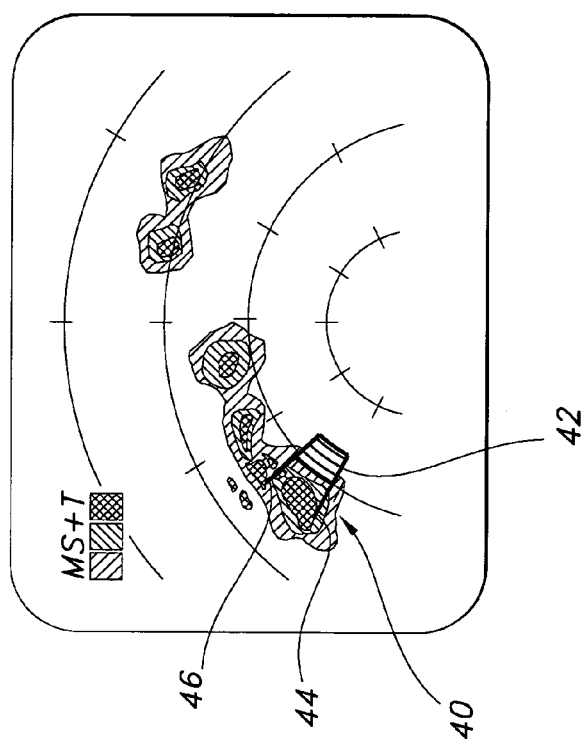
FIG. 4 is yet another representation of a display output according to the invention.

FIG. 4 is a display output showing a graphical icon 40 according to another embodiment of the invention. Graphical icon 40 is a "hazard bar" icon and is comprised of a generally square or rectangular portion 42 with alternating bars of magenta and a contrasting color such as black. A pair of lines 44, 46 extend back from the sides of the rectangular portion. Graphical icon 40 may be similar in design to known windshear icons in that graphical icon 40 identifies hazardous situations, but graphical icon is constructed and colored such that it cannot be confused with a windshear warning icon.

Figure 5:
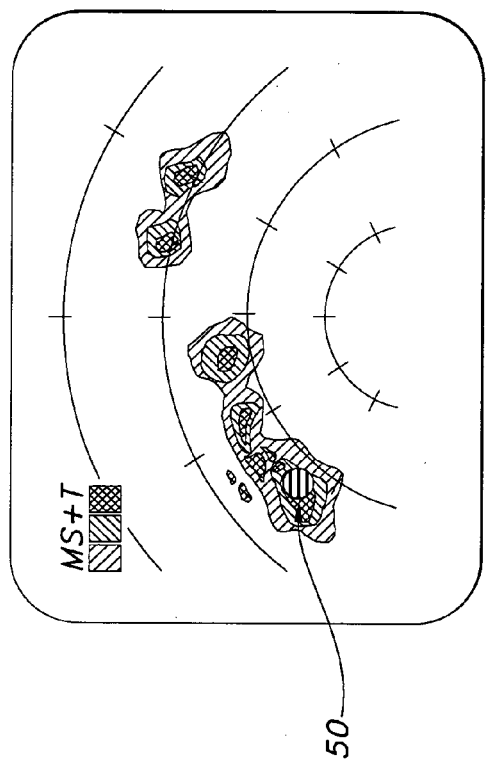
FIG. 5 is still another representation of a display output according to the invention.
Figure 6A:
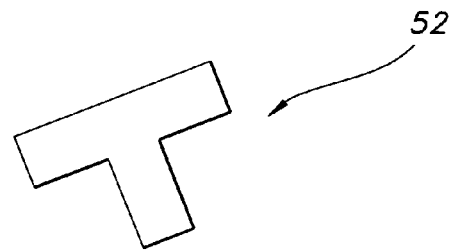
FIG. 6A is a severe turbulence icon according to still another embodiment of the invention.
Figure 6B:
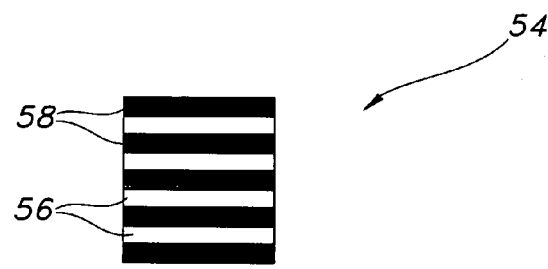
FIG. 6B is a severe turbulence icon according to yet another embodiment of the invention.
Figure 6C:
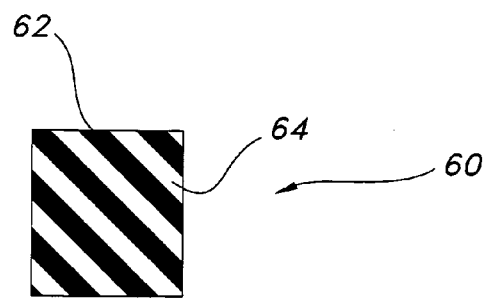
FIG. 6C is a severe turbulence icon according to still another embodiment of the invention.

Other designs for the hazardous turbulence icon are contemplated and are within the scope of the invention. For example, FIG. 5 shows a graphical icon 50 that resembles a circle having alternating bars of magenta and a contrasting color such as black, with a border of a contrasting color such as black to enable it to be readily seen when overlaid upon other display elements. FIG. 6A is an icon 52 in the shape of a "T" and is preferably colored magenta. FIG. 6B is a generally rectangular icon 54 having alternating bars 56, 58 of magenta and a contrasting color such as black. In a preferred embodiment the magenta bars are 3 units thick and the contrasting bars are 5 units thick, although the relative thicknesses of the bars may be varied as desired. FIG. 6C shows an icon 60 having alternating areas or stripes 62, 64 of magenta and a contrasting color. The alternating areas or stripes may be of any desired width. Other icon designs are possible and are within the scope of the invention.

Figure 7:
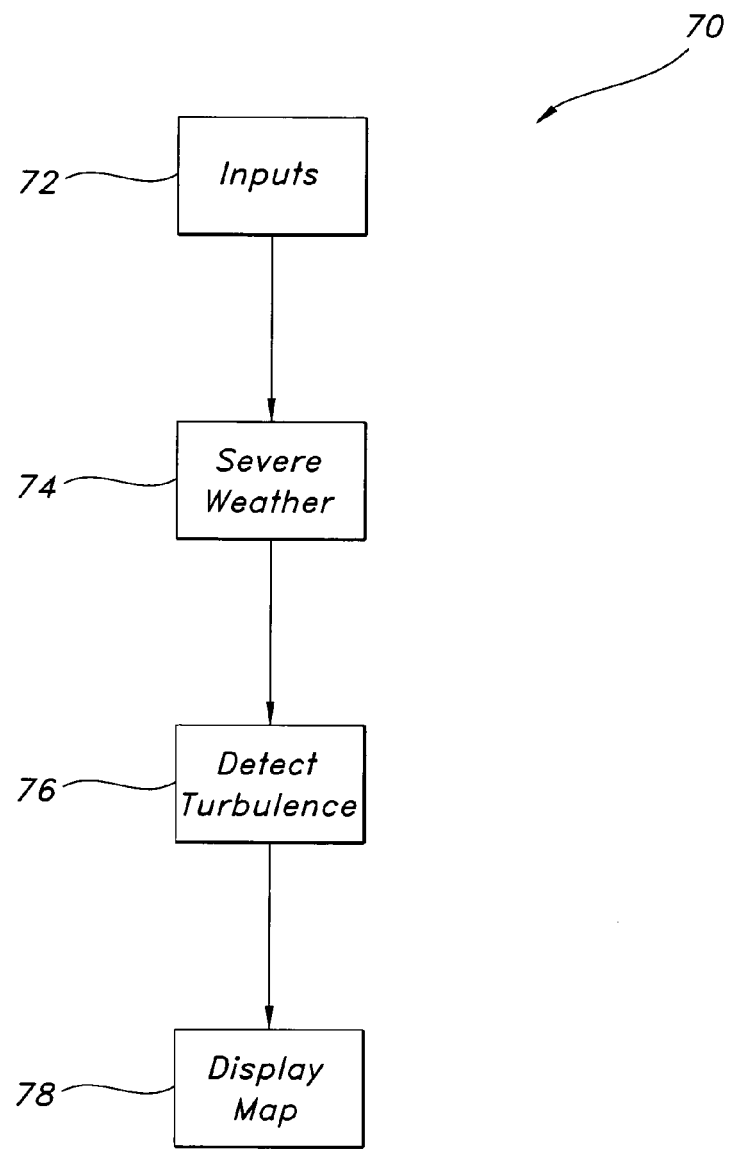
FIG. 7 is a representation of a method according to the invention.

FIG. 7 is a flowchart of a method 70 of identifying and displaying to a viewer in an aircraft turbulent weather conditions. In step 72 data from a plurality of inputs, such as sensors or ground-based weather transmissions, is processed to create a weather map. In step 74 regions of weather severity are determined within a range of possible flight paths of the aircraft. As previously disclosed, the regions of weather severity are assigned different colors to apprise a viewer of the respective severity level. In step 76 the processor detects turbulent regions in the area surrounding the aircraft. Regions having a measure of turbulence less than a predetermined amount are judged to be slightly or moderately turbulent and are rendered as a group of randomized spots in a warning color such as magenta. If the spots are superimposed upon a color such are red, the magenta spots are enlarged to be more easily visible to the viewer. Regions having a measure of turbulence greater than the predetermined amount are judged to be severely turbulent and are indicated by superimposing a solid magenta region or a turbulence icon upon the displayed turbulent region such as those shown in the Figures. In step 78 the weather map is rendered on a display.

The invention may be varied in many ways. For example, functions and data processing disclosed herein as being performed by a processor onboard an aircraft may alternatively be performed by a ground-based processor. Any number of colors may be used to render the graphical icon, and the shape and/or colors of the turbulence icon may otherwise be varied or modified as desired to ensure the icon is visible even in a cluttered display output. The speckled pattern of spots indicating turbulence areas 32*a* and 32*b* may be distributed according to a predetermined pattern. Also, while levels of turbulence (e.g., slight, moderate, and severe) have been defined herein as being tied to varying levels of discomfort or damage, other measures or indicators of turbulence may alternatively be used to differentiate between the levels of turbulence displayed by the invention.

An advantage of the invention is that turbulent regions may be depicted while differentiating between slight-to-moderate, non-damaging turbulence and severe, hazardous turbulence.

Another advantage is that the enlargement of the display of moderate turbulent regions and the display of turbulence icons are embedded in the information sent to the display by the processor. No modifications to the display itself are required, and certification of a weather system embodying the invention may therefore be easier to obtain than if the display were required to be modified.

Still another advantage is that the turbulence icons can easily be seen in a cluttered display background. A pilot or other observer should have no trouble noticing a potentially hazardous turbulent region.

Yet another advantage is that the shape and colors of the turbulence icons are designed to be intuitive to a viewer. Users of the system would not need extensive training to understand and use a weather system that includes the invention.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of displaying areas of turbulent weather, comprising:
   processing data representative of weather conditions within a predefined area;
   displaying the weather conditions on a display;
   detecting turbulence within the predefined area;
   determining a level of the detected turbulence;
   superimposing first graphical elements upon the display of weather conditions when the level of the detected turbulence is less than a predetermined amount; and
   superimposing a second graphical element upon the display of weather conditions when the level of the detected turbulence is more than the predetermined amount.

2. The method of claim 1, wherein the first graphical elements are a plurality of dots superimposed upon the display of weather conditions, wherein a number of the plurality of dots increases as the level of the detected turbulence increases up to the predetermined amount.

3. The method of claim 1, further including:
   displaying the weather conditions using a plurality of colors to represent a corresponding plurality of weather severity levels, wherein at least one of the first graphical elements and the second graphical element are rendered in a color different from the plurality of colors used to represent the weather severity levels; and
   increasing a size of the first graphical elements when the first graphical elements are superimposed upon a color representing a high weather severity level.

4. The method of claim 3, wherein the color representing the high severity level is red.

5. The method of claim 1, wherein the second graphical element is an icon configured to contrast in appearance with the display of weather conditions.

6. The method of claim 1, further comprising:
   providing an avionics display in an aircraft; and
   displaying the detected turbulence on the avionics display.

7. An avionics weather display system, comprising:
   means for processing data representative of weather conditions within a predefined area;
   means for displaying the weather conditions;
   means for detecting turbulence within the predefined area;
   means for determining a level of the detected turbulence;
   means for superimposing first graphical elements upon the means for displaying the weather conditions when the level of the detected turbulence is less than a predetermined amount; and
   means for superimposing a second graphical element upon the means for displaying the weather conditions when the level of the detected turbulence is more than the predetermined amount.

8. The system of claim 7, wherein the first graphical elements are a plurality of dots superimposed upon the display of weather conditions, wherein a number of the plurality of dots increases as the level of the detected turbulence increases up to the predetermined amount.

9. The system of claim 7, wherein the means for displaying the weather conditions uses a plurality of colors to represent a corresponding plurality of weather severity levels, wherein at least one of the first graphical elements and the second graphical elements are rendered in a color different from the plurality of colors used to represent the weather severity levels; and
   means for increasing a size of the first graphical elements when the first graphical elements are superimposed upon a color representing a high weather severity level.

10. The system of claim 9, wherein the color representing the high severity level is red.

11. The system of claim 7, wherein the second graphical element is an icon configured to contrast in appearance with the display of weather conditions.

12. The system of claim 7, wherein the means for displaying is an avionics display disposed in an aircraft.

13. An avionics weather display system, comprising:
   a processor that processes data representative of weather conditions within a predefined area, detects turbulence within the predefined area, and determines a level of the detected turbulence; and
   an avionics display that depicts weather conditions within the predefined area, including the detected turbulence;
   wherein the depiction of the detected turbulence is a plurality of first graphical elements superimposed upon the depicted weather conditions when the level of the detected turbulence is less than a predetermined amount, and further wherein a second graphical element is superimposed upon the depiction of weather conditions when the level of the detected turbulence is more than the predetermined amount.

14. The system of claim 13, wherein the first graphical elements are a plurality of dots superimposed upon the display of weather conditions, wherein a number of the plurality of dots increases as the level of the detected turbulence increases up to the predetermined amount.

15. The system of claim 13, wherein the depiction of the weather conditions uses a plurality of colors to represent a corresponding plurality of weather severity levels, and further wherein at least one of the first graphical elements and the second graphical elements are rendered in a color different from the plurality of colors used to represent the weather severity levels; and increasing a size of the first graphical elements when the first graphical elements are superimposed upon a color representing a high weather severity level.

16. The system of claim 15, wherein the color representing the high severity level is red.

17. The system of claim 13, wherein the second graphical element is an icon configured to contrast in appearance with the depiction of weather conditions.

18. The system of claim 17, wherein the graphical icon includes a circular element.

19. The system of claim 17, wherein the graphical icon has a shape substantially resembling a shape of a turbulent area to be identified.

20. The system of claim 17, wherein the graphical icon resembles an "X".

* * * * *